W. F. GOODWIN.
Harvester Rake.
No. 72,839.
Patented Dec. 31, 1867.
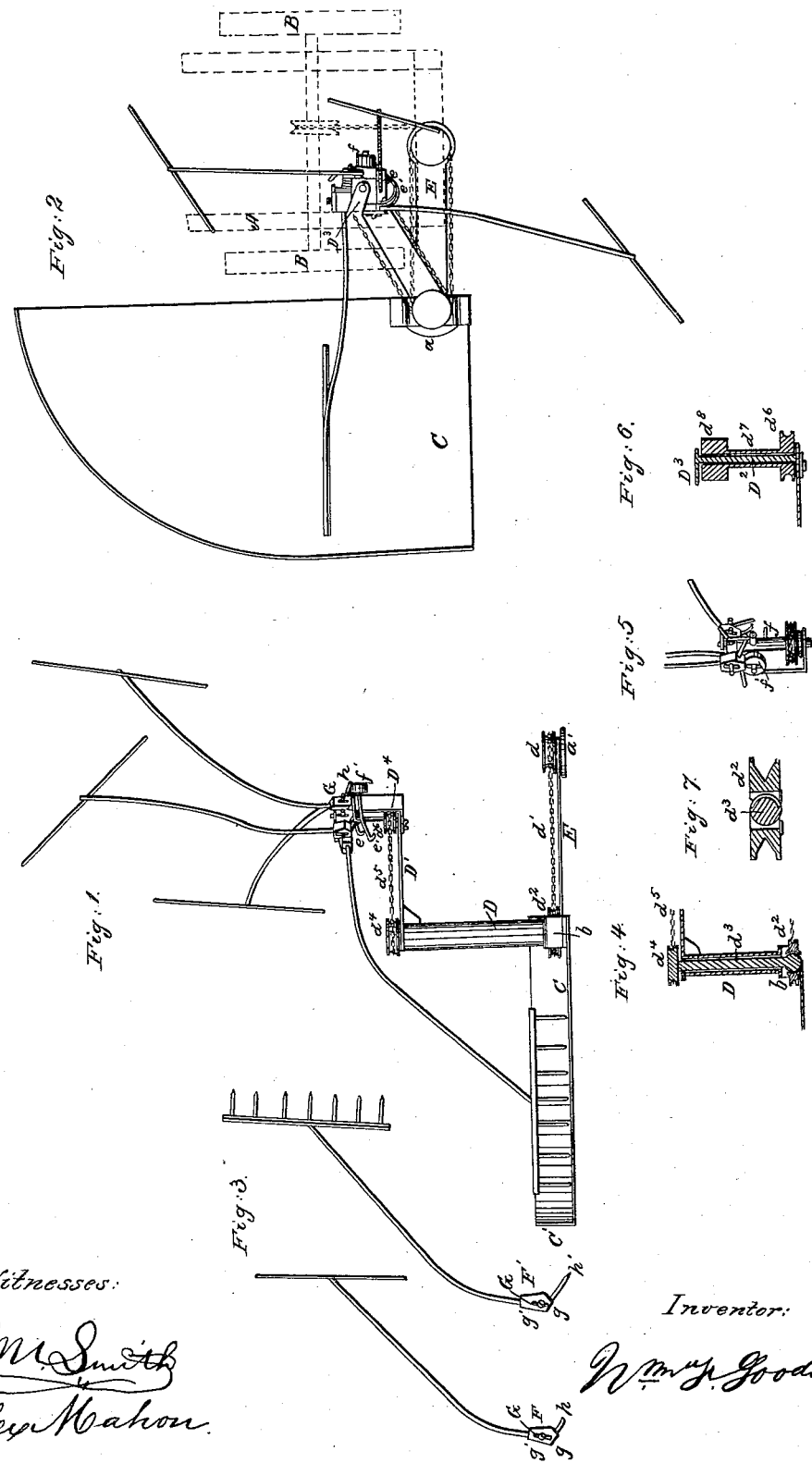
Witnesses:
Inventor:

UNITED STATES PATENT OFFICE.

WILLIAM F. GOODWIN, OF EAST NEW YORK, N. Y.

IMPROVEMENT IN HARVESTER-RAKES.

Specification forming part of Letters Patent No. 72,839, dated December 31, 1867.

*To all whom it may concern:*

Be it known that I, WILLIAM F. GOODWIN, of East New York, Kings county, State of New York, have invented a new and useful Improvement in Harvester-Rakes; and I do hereby declare that the following is a full and exact description thereof, reference being had to the accompanying drawings, in which—

Figure 1 is a front elevation of so much of a harvesting-machine as is necessary to show my improvement. Fig. 2 is a plan or top view. Fig. 3 is a view of a rake, and also of a reel-arm detached. Fig. 4 is a vertical section through the rake, driving-shaft, and hollow standard. Fig. 5 is a detached view, showing the rake and reel head and the operative parts connected therewith. Fig. 6 is a vertical section of the hollow shaft and head to which the rake and reel arms are connected, and Fig. 7 is a vertical section through the ball-and-socket connection of the rake-shaft and its driving-pulley.

Similar letters of reference denote corresponding parts in all the figures.

My invention has for its object the adaptation of a revolving rake and reel combined to a forward-cut hinged-bar machine, or to one in which the cutting-apparatus and platform are connected to the main frame of the machine by means of a coupling-arm, which is hinged or jointed at both its ends; and it consists in the employment of a ball-and-socket connection between the vertical rake-shaft and its driving mechanism, arranged in line with the joint at the inner end of the cutting apparatus and platform; in the arrangement of the driving-pulleys or sprocket-wheels and chains upon the coupling-arm and rake-standard, so as to conform to the movements of said coupling-arm and rake-standard; and in the means for raising and sustaining and for depressing and holding down the revolving rake and reel arms, as will be hereinafter explained.

To enable others to understand and use my invention, I will proceed to describe the same in detail, with reference to the accompanying drawing, in which—

A represents the main frame of the machine; B B, the driving-wheels, which may be of any usual or desired construction.

C is the platform, made in form substantially as shown in Fig. 2, so that the curved outer edge shall conform to, or nearly to, the path of the outer end of the rake in sweeping over the same, and provided with the curved fender or grain-guard C'.

The inner edge, near the front corner, is cut away, as shown at $a$, and has bolted or otherwise firmly secured to it a straddling tubular standard, D, through a fork or arms $b$, attached to its lower end, or forming part of said standard, in such manner as to straddle the opening $a$ in the side of the platform or finger-bar.

Between the upright parts of straddling arms $b$ is secured the platform end of the coupling-arm E by means of a horizontal pivot or pivots attached to said end, which pass into and have their bearings in the standard-arms $b$ $b$, in such manner as to allow the standard and the platform to which it is bolted to vibrate freely thereon in relation to the coupling-arm. The inner or main frame end of said coupling may be hinged to the main frame in line with the crank-shaft, through which motion is imparted to the cutters, or any other suitable point, and in any desired manner.

On the upper end of the tubular standard D is secured the horizontal arm $D^1$, arranged to project inward over the inner drive-wheel and inner side of the frame, and provided with the upright axle or arm $D^2$, which, in turn, has secured to it, at its upper end, the horizontal plate or cap $D^3$. $D^4$ is also an upright arm, secured to arm $D^1$ in such a manner as to afford a support for the necessary camways and friction-rollers, hereinafter described.

On the coupling-arm E, at or near its main-frame end, is secured a pivot or shaft, arranged perpendicularly to said coupling, and on which is mounted a horizontal driving-pulley or sprocket-wheel, $d$, to which motion is imparted by a chain or a belt from a pulley on the main or counter shaft in any desired or usual manner.

$d^2$ is an annular pulley or sprocket, at the outer or platform end of the coupling-arm D, to which motion is imparted from pulley $d$ by chain or band $d^1$.

The pulley $d^2$ is provided with an enlarged central spherical opening or socket, adapted to receive a ball formed on the lower end of vertical shaft $d^3$, which has its bearings in the tubular standard D. (See Fig. 4.) Said ball has a groove formed or cut in its surface, to receive a pin secured to the inner or socket face of the annular pulley in such manner as to cause the rotation of the ball and the shaft to which it is attached with the pulley $d^2$. Said pulley is further provided with a series of small arms (or a cup-shaped plate) on its under surface, which project over or form a bottom to the socket formed therein, for the purpose of preventing the displacement of the ball relative thereto.

$d^4$ is a pulley or sprocket-wheel, attached to the upper end of shaft $d^3$, from which motion is communicated, through chain or band $d^5$, to a similar pulley or wheel, $d^6$, on the lower end of vertical tubular shaft $d^7$, which is mounted on the upright axle $D^2$, and to the upper end of which shaft is secured the squared or polygonal rotating head $d^8$, to which the revolving rake and reel arms are attached in a manner that will be hereinafter explained. The external upright arm, $D^4$, is provided at the upper end with a horizontal plate or cap-piece, which may be perforated or otherwise arranged to receive and form a bearing for the upper end of the tubular shaft $d^7$.

$e\ e'$ are curved inclined ways secured to the arm $D^4$, and $f\ f'$ are friction-rollers, also secured to said arm through lugs or flanges and horizontal pins, arranged as shown in Figs. 1, 2, and 5. Said ways and friction-rollers serve to regulate the rising and falling movements of the rake.

F F' represent the rake and reel arms, secured to angular blocks or heads G, made in form substantially as shown in Fig. 3, and perforated to receive pins or pivots attached to the sides of the rotating head $d^8$, and upon which they are keyed in such manner as to be free to turn to accommodate the necessary rising and falling movement of the rake and reel arms in gathering in the grain, sweeping the platform, or passing over the main frame. The blocks or heads G, to which the rake and reel arms are attached, are provided with angular faces $g\ g'$, and with the bent or angular extension or tail-pieces $h\ h'$.

The tail-piece or extension from the rake arm or head, it will be seen, is made somewhat longer than that of the reel-arms, and is set in a different relation to the block or head, being located nearer to the outer face thereof, in such manner as to pass by without touching or being operated by the friction-roller $f$ and inclined camway, which control the rising and falling movement of the reel-arms, the rake-arm, through its extension, being acted upon by the roller $f'$ and lower curved way, $e'$.

The operation is as follows: Motion being communicated from the main driving or counter shaft by means of a chain similar to or a continuation of chain $d^1$, working over pulley $d$, or upon a pulley similar thereto, (represented at $a'$,) through chain $d^1$, to annular pulley $d^2$, and vertical shaft $d^3$, and pulley $d^4$, thence, by means of chain $d^5$, to the tubular rake-shaft $d^7$, polygonal head $d^8$, and rake and reel arms F F, the latter is caused to rotate with the shaft $d^7$, and the necessary rising and falling movements are imparted thereto as follows: The rake F, being supposed to have just descended into the position shown in Fig. 1, by the rotation of the polygonal head is caused to sweep over the platform, its outer end conforming to the contour of the outer edge of the platform until it reaches the point of delivery, at which point, the heel-extension coming in contact with the friction-roller $f'$, the rake-arm is thrown up into a vertical or elevated position for passing the main frame and driver-seats on its return movements, in which elevated position it is maintained by the action of angular face $g$ and tail-extension $h'$, in resting upon the curved way $e$, and top or cap of plate $D^4$, until the angular face of block G strikes against cap $D^3$, which causes the rake to be again turned downward, controlled in its descent by the resistance of the inclined way $e'$ upon the tail-extension $h$, until it reaches the desired degree of depression to reel the grain into the cutters, and again to sweep the platform. The reel-arms, of which there may be any desired number, are acted upon in a similar manner by the inclined way $e$ and roller $f$, except that the different curvature given to said inclined way allows the reel-arms to descend into the grain in a position slightly in advance of that in which the rake-head falls relative to the platform, for the reason that not being provided with teeth, as the rake-head is, this movement becomes necessary for the more effective reeling in of the grain to the cutter; also, it not being necessary that the reel-arms should sweep the platform further than to effectually deposit the grain thereon, the roller $f$, by which it is raised, is placed in advance of the rake-roller, and serves to raise the reel-arms away from the platform the moment the grain is properly deposited thereon.

One advantage of the construction and arrangement of the rake herein described is the placing fulcrum thereof over the main frame, between the wheels, the object of which arrangement is to obtain a long sweep from front to rear of the driving-wheels in a front-cut machine, and the fulcrum being in an elevated position, the rake and reel are caused to descend more squarely into the grain.

The relative number of rake and reel arms may be changed from that shown and described; but it is believed that the arrangement shown will be found best adapted to practical use.

Having now described my invention, what I claim as new is—

1. The ball-and-socket connection between the vertical rake-shaft and its driving mechanism, substantially as described.

2. The arrangement of the ball-and-socket joint in the rake-driving mechanism in line with the hinge or joint of the cutting apparatus or platform, substantially as described.

3. The driving pulley and chains, in combination with the coupling-arm, or its equivalent, and the rake-standard, arranged substantially as described.

4. The separate inclined ways $e\ e'$, for regulating the depression of the rake and reel arms independently of each other, as described.

5. The friction-rollers $f f'$, arranged to regulate the elevation of the rake and reel arms independently of each other, as described.

6. The angular head G, in combination with cap $D^3$ and inclined ways $e\ e'$, substantially as and for the purpose described.

WM. F. GOODWIN.

Witnesses:
ALEX. MAHON,
MOSES FOSTER.